No. 820,322. PATENTED MAY 8, 1906.
C. C. SIBLEY & G. A. LUTZ.
ELBOW FOR CONDUITS FOR ELECTRIC WIRES.
APPLICATION FILED DEC. 21, 1903. RENEWED OCT. 23, 1905.
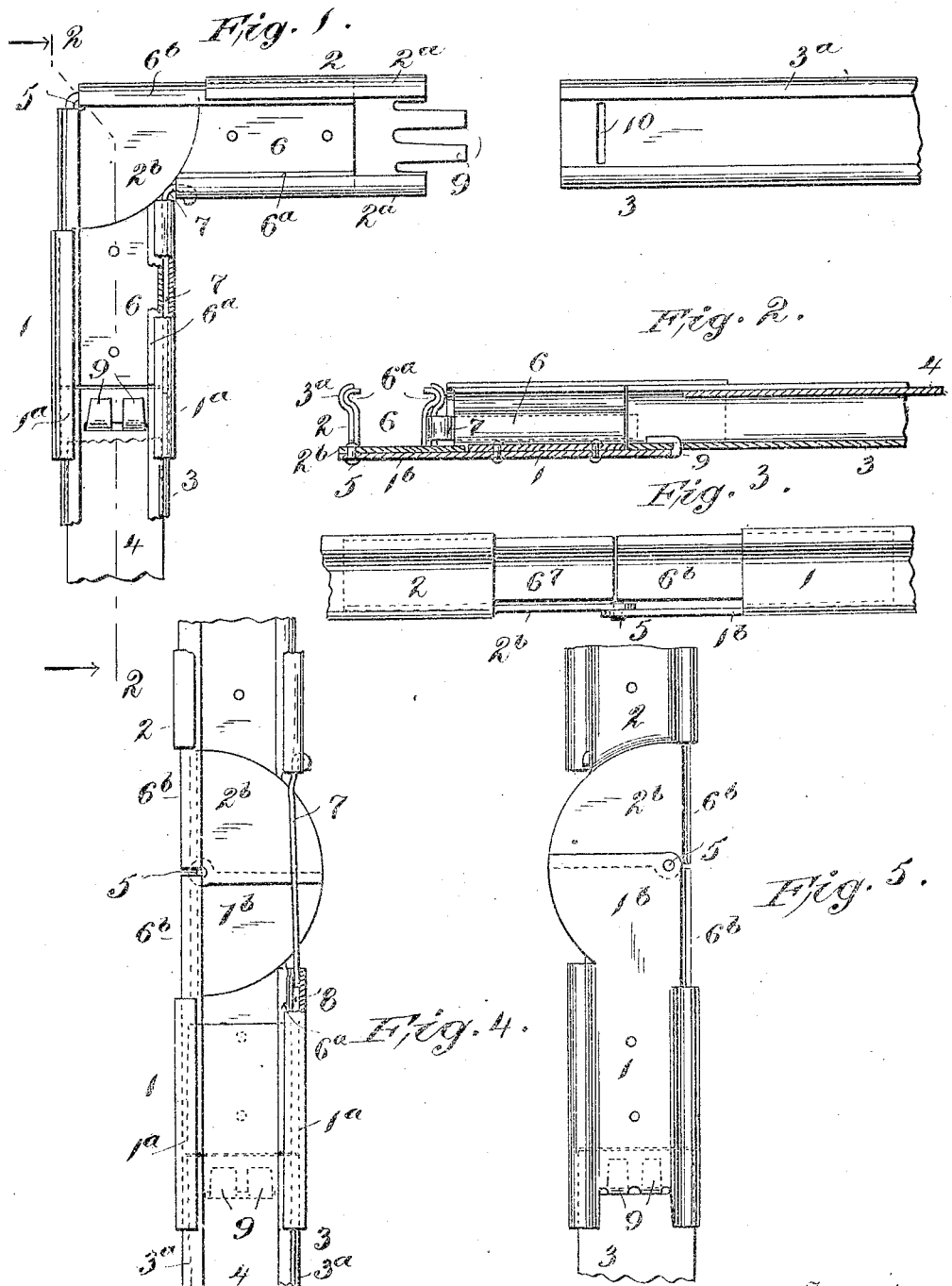

UNITED STATES PATENT OFFICE.

CLARENCE C. SIBLEY, OF PERTH AMBOY, NEW JERSEY, AND GEORGE A. LUTZ, OF NEW YORK, N. Y.

ELBOW FOR CONDUITS FOR ELECTRIC WIRES.

No. 820,322.     Specification of Letters Patent.     Patented May 8, 1906.

Application filed December 21, 1903. Renewed October 23, 1905. Serial No. 284,036.

*To all whom it may concern:*

Be it known that we, CLARENCE C. SIBLEY, residing at Perth Amboy, Middlesex county, New Jersey, and GEORGE A. LUTZ, residing at New York city, borough of Brooklyn, New York, citizens of the United States, have invented certain new and useful Improvements in Elbows for Conduits for Electric Wires, of which the following is a specification.

Our invention relates to improvements in the class of movable elbows set forth in United States patent of George A. Lutz, No. 689,894, dated December 31, 1901, adapted for use in connection with conduits for electric wires, which elbows are specially adapted for use in connection with the class of conduits shown in the patent to E. D. Page, No. 667,567, dated February 5, 1901, in which a channel-like conduit is provided with a removable cover.

The object of our invention is to so improve such elbows as to provide a bond-like connection between the elbow and the adjacent ends of conduits and to provide means for securely connecting the elbow with the conduits; and to these and other ends our invention comprises the novel details of improvement that will be more fully hereinafter set forth and then pointed out in the claims.

Reference is to be had to the accompanying drawings, forming part hereof, wherein—

Figure 1 is a face view of an elbow embodying our invention, showing a conduit in line with one end thereof. Fig. 2 is a section substantially on the line 2 2 in Fig. 1 looking in the direction of the arrows. Fig. 3 is a side view looking from the left in Fig. 4. Fig. 4 is a face view of the conduit, showing its main members alined; and Fig. 5 is a view looking at the back of Fig. 4.

Similar numerals of reference indicate corresponding parts in the several views.

In the drawings the numerals 1 2 indicate the main members of the elbow, which are shown in channel form, having one side open, adapted to receive the end portions of conduits 3. As shown in the drawings, the side walls of the members 1 2 have opposed grooved portions $1^a$ $2^a$, adapted to receive the correspondingly-shaped end portions of the conduits 3, whereby the grooved portions $3^a$ of the conduits will enter the grooved portions of the members 1 2, so that the grooves in the elbow members and in the conduits will aline to permit the passage of the cover 4 of the conduits along the elbow members. The conduits 3 and their covers, as shown, are generally of the character set forth in Patent No. 667,567. The members 1 2 are pivotally connected together, as at 5, so as to be capable of being turned at an angle to each other, or alined, as indicated in Figs. 1 and 4, or at any intermediate angle, all substantially as set forth in said Patent No. 689,894. As indicated in the drawings, the members 1 2 have extended portions $1^b$ $2^b$, joined at one edge by the pivot 5, one extension being adapted to overlap the other to form a closed wall in the various positions of adjustment. Within the members 1 2 are located relatively short sections or pieces 6, conforming to the shape of the members 1 2 and the conduits 3, and thus provided with grooved portions $6^a$, which lie within the grooved portions $1^a$ $2^a$ of the members 1 2, (see Fig. 2,) which sections 6 are preferably about the size of the corresponding conduit 3 and practically form a continuation thereof when the latter are attached to the members 1 2, whereby the grooves $6^a$ aline with the grooves $3^a$ of the conduit to provide guides for the covers 4. The outer ends of the sections 6 terminate at a distance inwardly from the ends of members 1 2 to provide spaces outwardly therebeyond to receive the conduits 3, whereby the conduits at their end portions are embraced by the members 1 2, and thus the conduits can abut against the ends of the sections 6 (see Fig. 1) to limit the inward movement of the conduits when being adjusted. The inner ends of the side walls of the members 1 2 are at a distance from the pivot 5 to permit the members 1 2 to be swung at angles, and as spaces would be formed at the angles we extend the sections 6 at one end, as at $6^b$, to a point substantially over the pivot 5, the grooves $6^a$ continuing to the end. To close the space between the ends of members 1 2 opposite the parts $6^b$, we provide a flexible strip 7, which is secured to one member, as 2, by bending the end back through a hole in the wall of the member, as in said Patent No. 689,894, and the free end of said strip passes into a guide or pocket 8, formed between the opposite member, as 1, and the corresponding section 6. (See Fig. 4.) As the members 1 and 2 are turned on the pivot 5 the strip 7 slides in the guide or pocket 8, and the strip 7 bends as required, thus keeping closed the space between the ends of the members 1 and 2.

The arrangements above described are such that the covers 4 can overlap the space between the main parts of the members 1 and 2, all whereby a closed channel is provided in the elbow. Furthermore, the members 1 and 2 serve as bonds for the end portions of the conduits, as the ends of the conduits pass into the members 1 and 2 and are inclosed thereby and by the covers, and thus the joints between the ends of the conduits and the sections 6 are also inclosed. Means are also provided for securing the ends of the conduits to the members 1 and 2 to keep them from displacement in the longitudinal direction. To this end we provide the ends of the members 1 and 2 with one or more prongs 9, adapted to pass through slots 10 in the bottom walls of the conduits 3 and to be bent back, as indicated in Figs. 1 and 2, to lock the parts together. The arrangement is such that the prongs 9 may first be bent at right angles to the member, the conduit 3 placed over the member with the slot 10 in line with the prong, and then the conduit will be pushed into place in the member and the prong next bent back.

Our improvements will be found advantageous where conduits of the class described are to extend at an angle to each other, as the elbows can be readily turned to the desired angle and connected with the ends of the conduits, and the conductors can be readily laid in the conduits and elbow and carried around the corners or angle, and then the covers can be slid along the grooves to overlap the conductors.

Various changes can be made in the arrangements shown without departing from the spirit of our invention.

Having now described our invention, what we claim is—

1. An elbow for conduits comprising a pair of members having channels and provided with opposed grooves and movably connected together, and independent sections within said members provided with grooved portions entering the grooves of said members adapted to aline with the grooves of corresponding conduits and to receive the covers therefrom, substantially as described.

2. An elbow for conduits comprising a pair of members having channels and provided with opposed grooves and movably connected together, and independent sections within said members provided with grooved portions entering the grooves of said members adapted to aline with the grooves of corresponding conduits and to receive the covers therefrom, said sections having extended sides provided with grooves, substantially as described.

3. An elbow for conduits for electric wires comprising members having bottom and side walls, the latter being provided with opposed grooves, said members being movably connected together, correspondingly-shaped sections located in said members and provided with grooved portions entering the grooves of said members, said members being pivotally connected together, and said sections having sides extended to a point adjacent to said pivot, substantially as described.

4. An elbow for conduits comprising members movably connected together, means for closing the openings adjacent to the adjacent ends of said members, and sections located in said members and having their outer ends at a distance from the ends of the members to permit the entrance of the ends of conduits into said members, substantially as described.

5. An elbow for conduits comprising a pair of channel-like members provided with opposed grooves and pivotally connected together, correspondingly-shaped sections located in said members and having grooved portions entering the grooves of said members, the main portions of the members terminating at a distance from the pivot, and one side of the sections also terminating at a distance from the pivot to permit the members to be turned at angles, said sections having extended portions on the same side as the pivot to close the corresponding side of the channel in the various positions of adjustment of the members, and means to close the space between the opposite sides of the members and the sections, substantially as described.

6. An elbow for conduits comprising a pair of channel-like members movably connected together and adapted to receive correspondingly-shaped conduits said members having means for firmly connecting them with said conduits, to prevent movement of the conduits in a longitudinal direction, substantially as described.

7. An elbow for conduits comprising a pair of channel-like members movably connected together and adapted to receive correspondingly-shaped conduits, said members being provided with prongs adapted to enter slots in the conduits and to be bent to lock the conduits to the members, substantially as described.

8. An elbow for conduits comprising channel-like members pivotally connected together and provided with opposed grooves, correspondingly-shaped sections located in said members and having grooved portions entering the grooves of the members, a guide or pocket being formed between the wall of the member and the corresponding wall of a section, and a flexible strip attached to the opposite member and adapted to slide in said guide or pocket to close the space between the corresponding ends of the members, substantially as described.

9. An elbow of the character described comprising a pair of channel-like members movably connected together and having opposed grooves, combined with correspondingly-shaped conduits having their end portions inclosed in said members to cover the ends of the conduit like a bond, and means for securing the members and conduits together from lengthwise displacement, substantially as described.

CLARENCE C. SIBLEY.
GEO. A. LUTZ.

Witnesses:
 GEO. W. BLUNT,
 T. F. BOURNE.